(12) United States Patent
Sakschewski et al.

(10) Patent No.: US 9,590,527 B2
(45) Date of Patent: Mar. 7, 2017

(54) INVERTER AND OPERATING METHOD FOR AN INVERTER

(71) Applicant: SMA Solar Technology AG, Niestetal (DE)

(72) Inventors: Vitali Sakschewski, Fuldabrueck (DE); Stijn Stevens, Benterode (DE); Christian Hardt, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 0 days.

(21) Appl. No.: 14/855,808

(22) Filed: Sep. 16, 2015

(65) Prior Publication Data
US 2016/0006366 A1    Jan. 7, 2016

Related U.S. Application Data

(63) Continuation of application No. PCT/EP2014/055593, filed on Mar. 20, 2014.

(30) Foreign Application Priority Data

Mar. 20, 2013  (DE) .................. 10 2013 102 837.3

(51) Int. Cl.
*H02M 1/08* (2006.01)
*H02M 7/44* (2006.01)
*H02J 3/38* (2006.01)
*H02M 7/5387* (2007.01)
*H02M 1/32* (2007.01)

(52) U.S. Cl.
CPC ............... *H02M 7/44* (2013.01); *H02J 3/383* (2013.01); *H02M 7/53875* (2013.01); *H02M 1/32* (2013.01); *Y02E 10/563* (2013.01)

(58) Field of Classification Search
CPC ........... H02M 1/08; H02M 1/12; H02M 7/537
USPC ........................................ 363/40, 41, 95, 97
See application file for complete search history.

(56) References Cited

U.S. PATENT DOCUMENTS

| | | | |
|---|---|---|---|
| 5,493,485 A | 2/1996 | Okado | |
| 8,681,515 B2 * | 3/2014 | Bae | H02H 3/38 363/36 |

(Continued)

OTHER PUBLICATIONS

Ghatpande, Omkar et al. "Multiple Reference Frame Theory for Harmonic Compensation via Doubly Fed Induction Generators.", IEEE 2013, pp. 60-64.

(Continued)

*Primary Examiner* — Jeffrey Sterrett
(74) *Attorney, Agent, or Firm* — Eschweiler & Associates, LLC

(57) ABSTRACT

A method for operating an inverter which is connected to an energy supply grid via a transformer for feeding in electrical energy into the energy supply grid, includes measuring output currents and output voltages of the inverter, and actuating power switches of the inverter using actuation signals that are generated as a function of the measured output currents and the measured output voltages at a fundamental frequency of the energy supply grid. The actuation signals are further generated as a function of a harmonic component of the measured output voltages of the inverter at a multiple of the fundamental frequency using a control loop with positive feedback.

12 Claims, 4 Drawing Sheets

(56) References Cited

U.S. PATENT DOCUMENTS

| | | | |
|---|---|---|---|
| 8,817,509 B2* | 8/2014 | Taniguchi | H02M 3/33561 363/140 |
| 2006/0004531 A1 | 1/2006 | Ye et al. | |
| 2009/0129132 A1* | 5/2009 | Furutani | H02M 7/4807 363/95 |
| 2013/0082636 A1* | 4/2013 | Ohori | H02P 4/00 318/723 |
| 2015/0177335 A1* | 6/2015 | Halt | G01R 31/40 363/95 |
| 2016/0006366 A1* | 1/2016 | Sakschewski | H02J 3/383 363/95 |
| 2016/0141978 A1* | 5/2016 | Matsuoka | H02M 7/537 363/97 |

OTHER PUBLICATIONS

Reyes, Manuel et al. "Enhanced Decoupled Double Synchronous Reference Frame Current Controller for Unbalanced Grid-Voltage Conditions." IEEE Transactions on Power Electronics, vol. 27, No. 9, Sep. 2012, pp. 3934-3943.

Morsy, Ahmed Salah et al. "Harmonic Rejection Using Multi-Synchronous Reference Frame Technique for CSI-Based Distributed Generation with Grid Voltage Distortion." Proceedings of the 2011 International Conference on Power Engineering, Energy and Electrical Drives. 5 pages.

* cited by examiner # INVERTER AND OPERATING METHOD FOR AN INVERTER

CROSS REFERENCE TO RELATED APPLICATIONS

This application claims priority to International Patent Application number PCT/EP2014/055593, filed on Mar. 20, 2014 which claims priority to German Patent Application number 10 2013 102 837.3, filed on Mar. 20, 2013, which are hereby incorporated by reference in their entirety.

FIELD

The disclosure relates to a method for operating an inverter which is connected to an alternating current (AC) grid via a transformer for feeding electrical energy into the AC grid. The disclosure further relates to an inverter configured to execute the operating method.

BACKGROUND

Inverters are operated to convert direct current (DC) into an alternating current (AC) which is suitable to be fed into an energy supply grid and which complies with grid standards. Such inverters may be used in photovoltaic (PV) installations. If galvanic separation between the energy supply grid and the inverter is desired or required due to guidelines or legal provisions for certain energy supply grids, a transformer is arranged between an AC output of the inverter and the energy supply grid.

For large PV installations which are directly connected to a medium voltage grid, the use of a transformer is essential for voltage adjustment. Additionally, it is usually required that the PV installation is effectively grounded. The requirement for effective grounding may be implemented in a technically proper and cost effective way by using a so-called Ynd transformer since such Ynd transformer does not comprise an electrically conductive path for possible fault currents running from the medium voltage side of the transformer into the PV installation. In some cases the use of such Ynd transformer is explicitly specified by the operator of the respective energy supply grid.

Current guidelines and regulations may further require that faults occurring in the energy supply grid can be detected from within the PV installation and that the PV installation disconnects itself from the energy supply grid after having detected certain types of faults in the energy supply grid. A relevant fault in this regard is given by a single-phase phase loss, i.e. an interruption of one of usually three phases occurring between the PV installation and the energy supply grid or within the energy supply grid, respectively.

For feeding-in of electrical energy into the energy supply grid, power switches of an output stage, e.g. of an output bridge of the inverter are actuated using a pulse-width modulation (PWM) method. Output currents and output voltages and their respective fundamental frequency are measured. Control values for the output currents are determined based on differences between target values and actual values of the output currents. Alternatively, in so-called voltage-controlled inverters, differences between target values and actual values of the output voltages are calculated and target values for the output voltages are determined. Pulse-width modulated actuation signals for the power switches of the inverter are generated based on the target values for the output currents or the output voltages, respectively, and the power switches are actuated according to the actuation signals.

US 2006/0004531 A1 discloses a method in which a fault within an energy supply grid is detected based on values of currents and voltages which are measured at a point where energy is feed into the energy supply grid. These current and voltage values are fed into a control loop of an inverter which is connected to the energy supply grid and evaluated in order to detect a fault.

In this method, the inverter is coupled to the energy supply grid directly, i.e. without interposition of a transformer.

If the electrical energy is fed-in via a transformer arranged between the inverter and the energy supply grid, certain faults within the energy supply grid may be projected onto the AC grid on the inverter-side of the transformer, i.e. onto the low-voltage side of the transformer. Hence, such faults may be detected on the low-voltage side of the transformer and taken into account if applicable. This projection strongly depends on the type of fault and on the type of transformer. Regarding the Ynd transformers, single-phase phase losses within the energy supply grid are not projected onto the AC grid beyond the transformer, i.e. within the PV installation. In such cases, according to the state of the art, a detection of the single-phase phase loss is only possible on the high voltage side of the transformer which is disadvantageous due to far more complex measurement equipment required as compared to measurements on the low voltage side of the transformer. When using other types of transformers, e.g. so-called YNy transformers, a phase loss is projected onto the PV installation side of the transformer and may be detected and taken into account using known operating methods of the inverter. On the other hand, an YNy transformer does not provide effective grounding which may be required as mentioned above.

SUMMARY

The disclosure is directed to an operating method for an inverter connected to an energy supply grid via a transformer in a galvanically isolated manner which enables detection of a single-phase phase loss occurring within the energy supply grid from the low voltage side of the transformer. The disclosure is further directed to an inverter configured to execute the operating method.

In a method according to one embodiment of the disclosure for operating an inverter, the inverter is connected to an energy supply grid via a transformer for feeding electrical energy into the energy supply grid. Output currents and output voltages of the inverter are measured and power switches of the inverter are actuated using actuation signals. The actuation signals are generated as a function of the output currents and the output voltages at a fundamental frequency of the energy supply grid.

The actuation signals are further generated as a function of a harmonic component of the output voltages of the inverter at a multiple of the fundamental frequency using a control loop with positive feedback. If any one of the phases of the energy supply grid is not connected to the transformer, an amplification of the harmonic components via the control loop with positive feedback results in an instability of the control loop and in an increase of the output currents at the frequency of the harmonic components. An amplitude of the output currents is monitored in one embodiment such that the inverter disconnects from the transformer or shuts down at least temporarily if the amplitude of the output currents exceeds a predetermined threshold. Alternatively or additionally, security measures arranged at the output side of the inverter, e.g. overcurrent protection fuses, are triggered.

In one embodiment the method enables a detection of a phase loss even when a transformer is used which does not project the phase loss from the high-voltage side to the low-voltage side of the transformer, i.e. from the energy supply grid to the inverter output at the fundamental frequency.

In an embodiment of the method, control values for the output currents are determined as a function of differences between target values and actual values of the output currents. Voltage components of the output voltages at a frequency of a harmonic component are measured, and target values for current components of the output currents at the frequency of the harmonic component are generated as a function of a temporal variation of the voltage components at the frequency of the harmonic component. Control values for the current components of the output currents at the frequency of the harmonic component are determined based on the target values for the current components of the output currents at the frequency of the harmonic component. The control values for the current components of the output currents at the frequency of the harmonic component are added to the control values for the output currents at the fundamental frequency. Pulse-width modulated actuation signals for the power semiconductor switches are generated based on the sum of the control values; and the power switches are actuated by means of the actuation signals.

In this manner, a control with positive feedback at a frequency of a harmonic component may be combined with a conventional control of the output current at the fundamental frequency. In an embodiment, the voltage component of the output voltages is filtered by means of a high pass filter in order to obtain their temporal variation.

In a further embodiment of the method, the actuation signals are determined using the control loop with positive feedback as a further function of output currents of the inverter, for example, as a function of differences between target values and actuals values of the current components of the output currents. In this embodiment the method is particularly suited for inverters with a current controlled output.

In a further embodiment of the method, the output voltages and/or the output currents as well as the voltage or current components at the frequency of the harmonic component are represented in a dq coordinate system. In particular, positive sequence voltage components or positive and negative sequence voltage components may be used in order to derive the control values for the output currents at the fundamental frequency. Furthermore, negative sequence components may be used exclusively in order to derive the control values for the current components of the output current at the frequency of the harmonic component. Handling voltage components and/or current components in the dq coordinate system enables the usage of static control strategies.

In a further embodiment of the method, the harmonic component is of the order (3n−1) with n=1,2,3, . . . . In particular, the harmonic component of eighth order (n=3) proves to be advantageous. The harmonic components of the order are excited by switching processes of the power semiconductor switches of the inverter to a very little extent. The positive feedback of the additional control loop may thus be equipped with a high amplification factor in order to detect a phase loss with high sensitivity, but still without jeopardizing the normal operation of the inverter.

An inverter according to one embodiment of the disclosure is configured to feed electrical energy into an energy supply grid via a transformer. The inverter comprises a control circuit that is configured to execute the method explained above.

BRIEF DESCRIPTION OF THE DRAWINGS

The disclosure will be further explained using the figures. In the figures.

DETAILED DESCRIPTION

Figure 1:
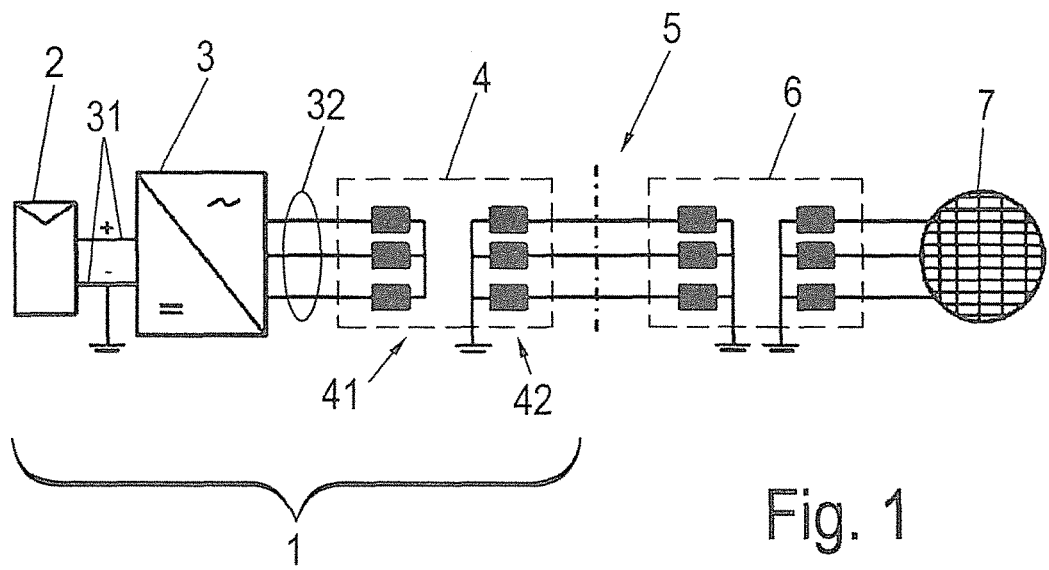
FIG. 1 shows a schematic view of a PV installation which is connected to an energy supply grid.

FIG. 1 shows a block diagram of a PV installation 1 as an example of a distributed power plant. The PV installation 1 comprises a PV generator 2 which is connected to a DC input 31 of an inverter 3. AC outputs 32 of the inverter 3 are connected to a primary side 41 of a transformer 4. The transformer 4 of FIG. 1 is configured as a medium voltage transformer which provides voltages in the range of 20 kV at its secondary side 42 and which is connected to a medium voltage grid 5 accordingly.

The structure of the PV installation is shown in FIG. 1 in an exemplary and simplified manner. The PV generator 2 which is symbolized in FIG. 1 by a symbol of a PV cell usually comprises a plurality of PV modules, in particular if the PV installation 1 feeds electrical energy directly into the medium voltage grid 5. Several of the PV modules may be interconnected serially to form so-called PV strings which in turn may be connected to the inverter 3 in parallel. The inverter 3 may be a central inverter in this kind of installation. The inverter 3 as shown in FIG. 1 is configured as a three-phase inverter as usual when connected to a medium voltage grid 5. FIG. 1 does only show those parts of the PV installation 1 that are relevant with regard to this application. Further elements which may be arranged on the DC side or the AC side of the inverter 3, such as relays, switches, filters or monitoring devices, are omitted for the sake of lucidity, but are contemplated by the present disclosure.

The medium voltage grid 5 is connected to a high voltage grid 7 via a high voltage transformer 6 which is usually arranged at a remote location with respect to the PV installation 1.

Due to the galvanic separation of the primary side 41 and the secondary side 42 of the transformer 4, the PV installation 1 may be grounded separately which is often required by operators of the energy supply grid 7. This grounding may be provided e.g. by connecting a negative pole of the PV generator 2 with an earth potential.

Due to the galvanic separation of the PV installation 1 from the medium voltage grid 5, it is difficult to identify during operation of the inverter 3 a phase loss of one or more of the phases of the medium voltage grid 5, e.g. a phase loss at a location as indicated by the dotted line in FIG. 1.

In the following and with reference to FIGS. 2 to 5, an operating method for an inverter, e.g. for the inverter 3 as shown in FIG. 1 will be described which enables a reliable and fast detection of a single-phase phase loss as described above.

Figure 2:
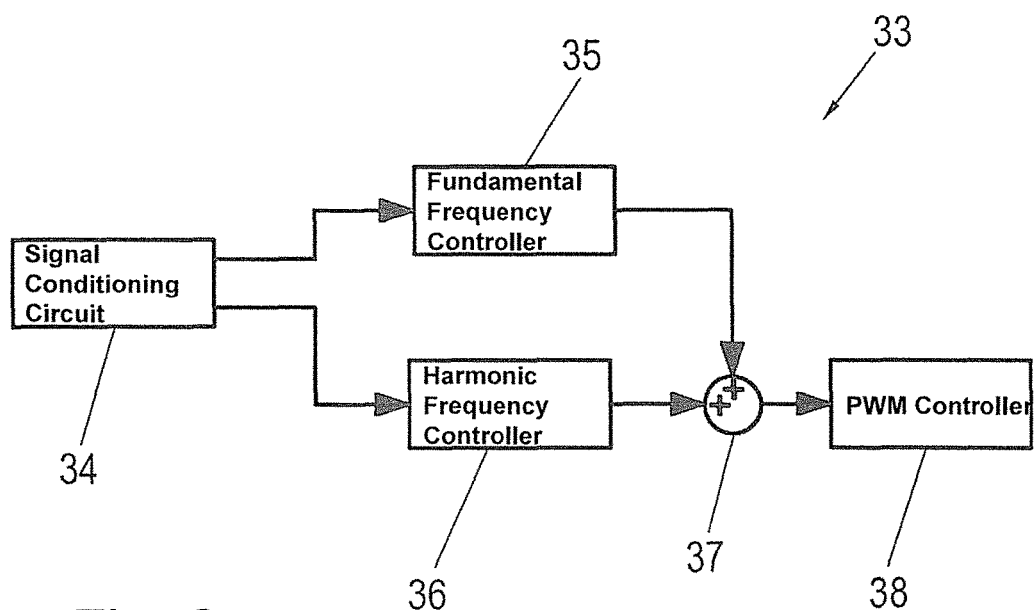
FIG. 2 shows a schematic view or block diagram of a control loop configured to control an inverter.

FIG. 2 shows a block diagram of a control loop 33 of the inverter 3. The control loop 33 provides the actuation of power semiconductor switches of an output bridge circuit of the inverter 3. The switches switch currents flowing at the AC outputs 32 of the inverter.

The control loop 33 comprises a signal conditioning circuit 34 which receives potentials and currents as measured at the AC output 32 of the inverter by measurement circuits associated with said AC output 32. Measurement signals output by the signal conditioning circuit 34 are fed into a fundamental frequency controller or processor 35 and a harmonic frequency controller or processor 36. Control values determined by the controllers 35, 36 are added by a mixer 37 and the resulting sums are forwarded to a PWM controller 38 as control values. The PWM controller or processor 38 generates actuation signals for the power semiconductor devices of the output bridges of the inverter 3.

Figure 3:
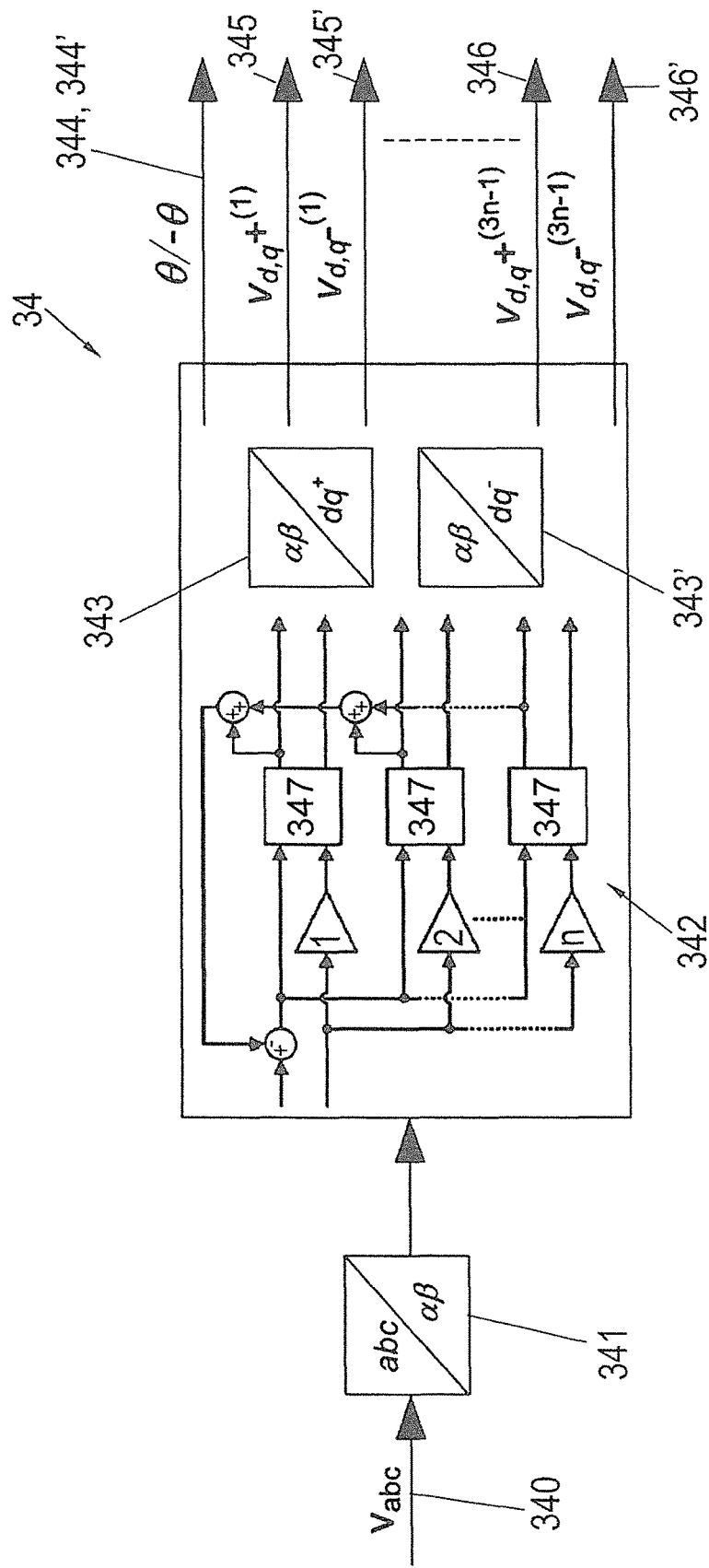
FIGS. 3-5 each show a block diagram of a respective part of the control loop according to FIG. 2.
Figure 4:
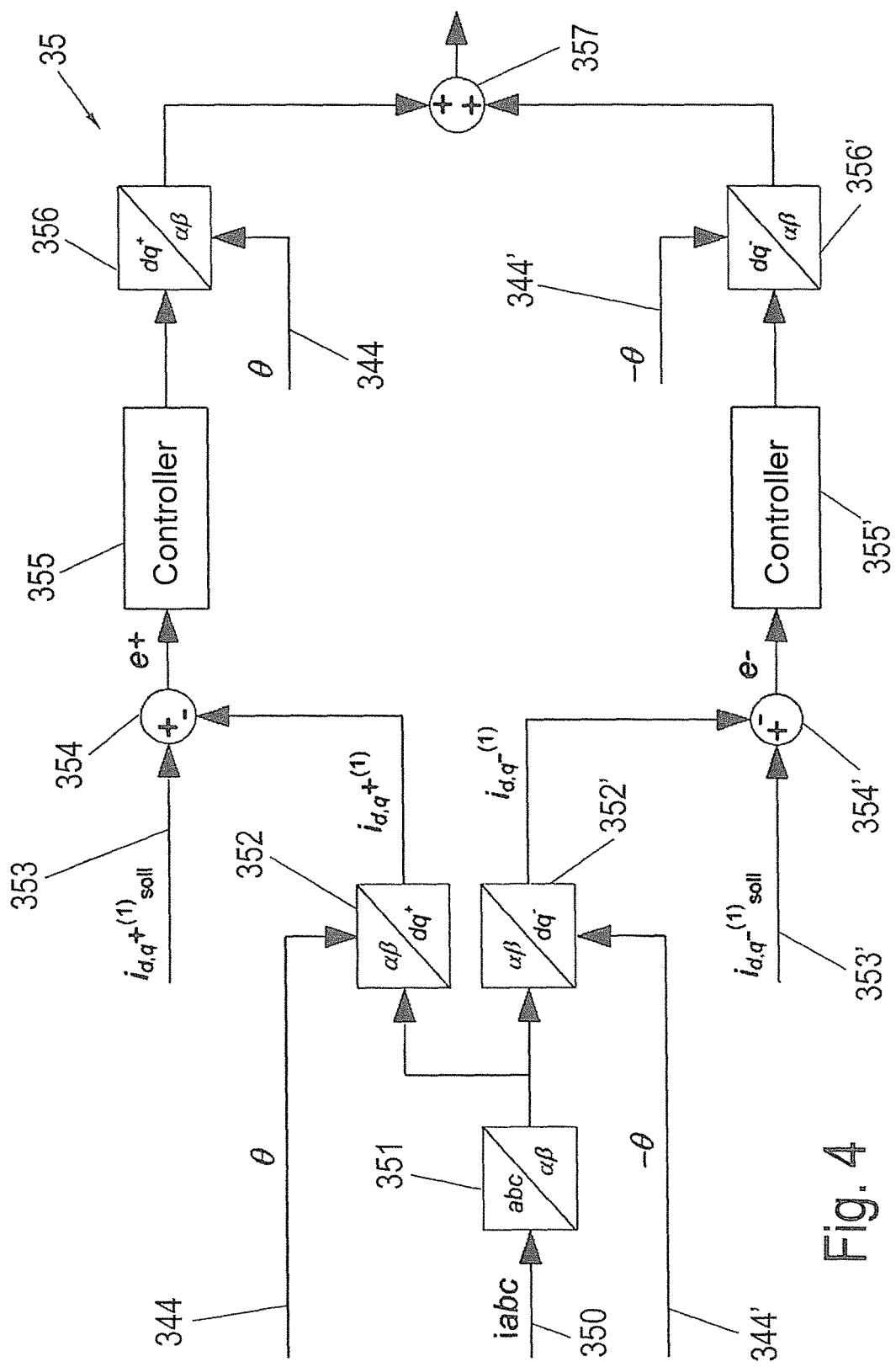
Figure 5:
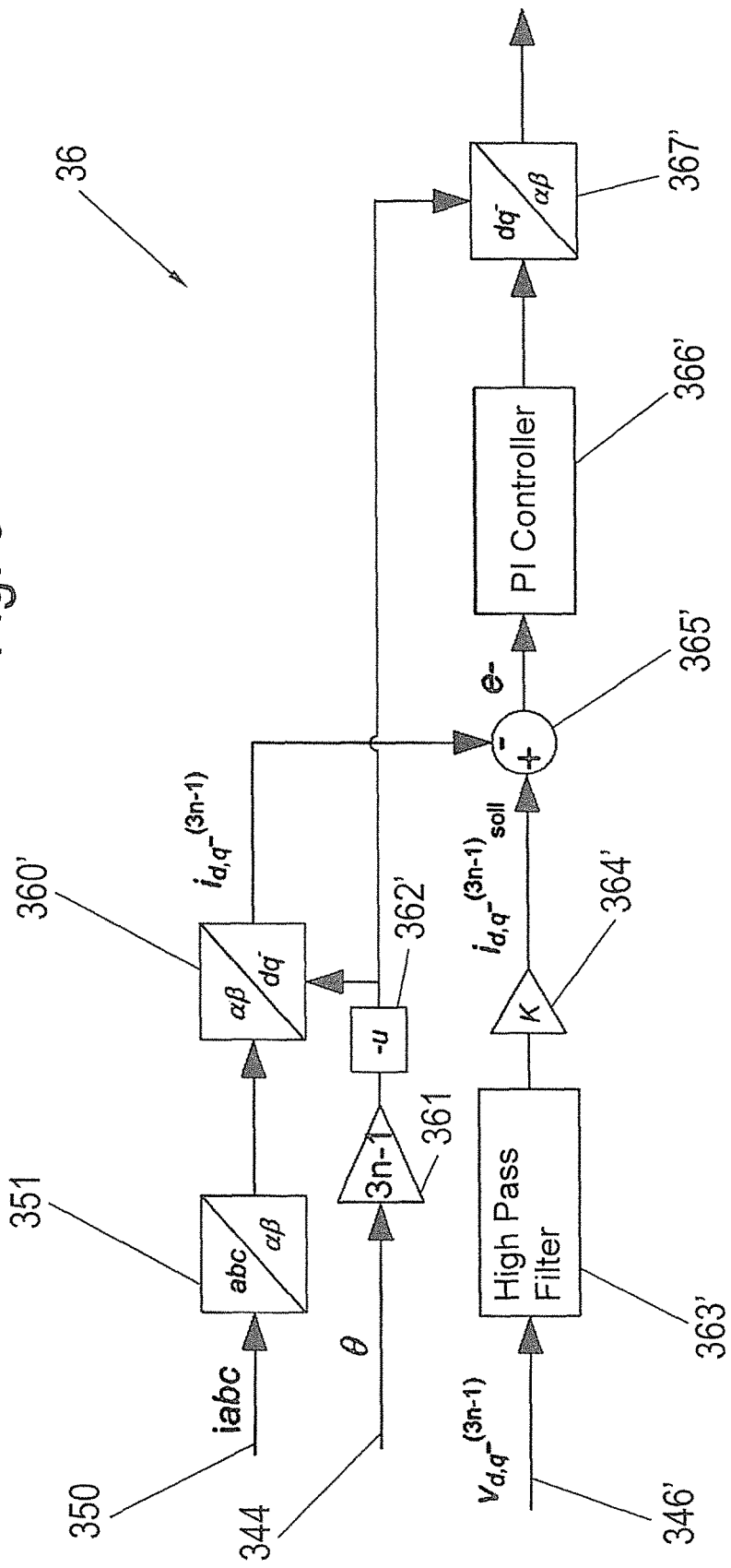

FIGS. 3, 4 and 5 show more detailed views of the signal conditioning circuit 34, the fundamental frequency controller 35 and the harmonic frequency controller 36 according to one embodiment. In the control loop 33 according to the embodiment shown in FIGS. 3, 4 and 5, the measured time-dependent current and voltage signals are transformed into a rotating coordinate system, a so-called dq coordinate system. By using this kind of rotating coordinate system, static controllers, e.g. proportional-integral (PI) controllers or processors may be used for processing the measurement signals. A positive sequence system as well as a negative sequence system with an inverted phase order are considered within the control loop 33 in one embodiment.

The processing of measurement values within an operating method of an inverter using a dq coordinate system is known. Hence, details of the transformation as well as the implementation of the transformation using analog and/or digital circuitry are omitted here. On the other hand, using a rotating dq coordinate system within the operating method is advantageous, but not mandatory. The method according to the disclosure may also be implemented using the time-dependent measurement values directly, i.e. represented within a stationary coordinate system and processed e.g. by a so-called sine controller.

FIG. 3 shows details of the signal conditioning circuit 34 of the control loop 33. Voltage measurement signals 340 which represent voltages $V_a$, $V_b$, $V_c$ at the individual phases a, b, c at the AC output 32 of the inverter 3 are combined into a vector $V_{abc}$ and used as input values for the signal conditioning circuit 34. The voltage measurement signal 340 is transformed in one embodiment into an orthogonal two-phase stationary coordinate system, a so-called αβ coordinate system, by a αβ transformation circuit 341. The αβ components obtained by this transformation are fed into a multi-resonant phase-locked loop (PLL) circuit 342.

The multi-resonant PLL circuit 342 comprises a plurality of PLL circuits denoted with the subscripts 1 to n. The first PLL circuit is tuned to a fundamental frequency of the voltage measurement signal 340, the second PLL circuit is tuned to a frequency of a first harmonic component of the voltage measurement signal 340, and the nth PLL circuit is tuned to a frequency of the (n−1)-th harmonic component of the voltage measurement signal 340 accordingly. The frequencies of the harmonic components are denoted in the following as first harmonic frequency, second harmonic frequency and so on. The individual PLL circuits may comprise quadrature signal generators 347 as known in the prior art. As an alternative to the multi-resonant PLL circuit 342, separate PLL circuits or bandpass filters may be used to determine the fundamental and harmonic components of the voltage measurement signal 340.

The output of the multi-resonant PLL circuit 342 is transformed into dq components by means of dq transformation circuits 343, 343'. The dq transformation circuit 343 determines positive sequence components and the dq transformation circuit 343' determines negative sequence components. The positive sequence system represents a purely symmetrical system and the negative sequence system, which comprises an inverted phase order with respect to the positive sequence, takes into account of asymmetries. In the following, within this specification, a reference numeral without an apostrophe (') denotes positive sequence components and a reference numeral with an apostrophe (') denotes negative sequence components.

As a result, the signal conditioning circuit 34 outputs synthesized phase angles 344 and 344' of the fundamental component as derived by the PLL circuit 342 for the positive and the negative sequence system. Furthermore, dq components 345, 346 and 345', 346' as derived by the dp transformation circuits 343 and 343' for the positive and negative sequence system, respectively, are output by the signal conditioning circuit 34. The dq components 345, 345' are associated with the fundamental component of the voltage measurement signal, and the dq components 346, 346' are associated with respective harmonic components.

FIG. 4 shows the fundamental frequency controller or processor 35 of the control loop 33 in more detail. A current measurement signal 350 which represent currents $I_A$, $I_B$, $I_C$ at the individual phases a, b, c at the AC output 32 of the inverter 3 are combined to form a vector $I_{ABC}$ and used as input values for the fundamental frequency controller 35. The current measurement signal 350 is transformed into an orthogonal two-phase stationary coordinate system by a αβ transformation circuit 351. The αβ components thus obtained are input into dq transformation circuits 352 and 352' which further receive the phase angles 344 and 344' from the signal conditioning circuit 34. The output of the dq transformation circuits 352 and 352' are input into the subtracting circuits 354 and 354', respectively, and represent actual current values. Target current values 353 and 353' are also input into said subtracting circuits 354 and 354', respectively. The target current values 353 and 353' are vectors comprising target values for d components and for q components, wherein the d component represents an active power and wherein the q component represents a reactive power. Difference signals generated by the subtracting circuits 354, 354' are input into controllers or processors 355, 355', respectively, which in this case are configured as PI controllers. Outputs of the controllers are transformed back into αβ components in the positive and in the negative sequence system by means of the dq backtransformation circuits 356 and 356', respectively, and summed up by means of an adder 357 which is arranged at the output of the fundamental frequency controller 35. When using operating methods according to the known prior art, the output of the adder 357 would be directly used for controlling the PWM controller as can be seen in FIG. 2.

FIG. 5 shows a block diagram of the harmonic frequency controller or processor 36 of the control loop 33 of FIG. 2. In line with the fundamental frequency controller 35, the current signal 350 is input into the harmonic frequency controller 36, transformed into αβ coordinates by the αβ transformation circuit 351, and fed into a dq transformation circuit 360'. Contrary to the dq transformation circuits 352 and 352' of the fundamental frequency controller 35, the dq transformation circuit 360' uses a phase angle for the dq transformation which is associated with a harmonic component. This phase angle of a harmonic component is derived from the phase angle 344 of the harmonic component by means of multiplication in a multiplier 361. After multiplication the sign of the phase angle of the harmonic component is changed by a sign changing circuit 362' such that the harmonic component is transformed from the positive sequence into the negative sequence. The resulting phase angle of the harmonic component is input into the dq transformation circuit 360' which transforms the current signal 350 at the frequency of the harmonic component into dq coordinates in the negative sequence system. The result of the transformation is used as actual current value within the harmonic frequency controller 36.

The target current value to be used by the harmonic frequency controller 36 is based on one of the dq components in the negative sequence 346' which were generated by the signal conditioning circuit 34 from the voltage measurement signal 340 for the harmonic component. This dq component 346' which has to be of the same order as used in the multiplier 361 of FIG. 4 is filtered by means of a high pass filter (HPF) 363' and amplified by the amplifier 364' with an adjustable amplification factor k. The output of the amplifier 364' is used as the target current value at the respective harmonic frequency. This target current value is a function of the variation of the voltage component 346' of the harmonic component, and represented as dq component in the negative sequence system.

The target current value and the actual current value are input into a subtracting circuit 365'. The output of the subtracting circuit 365', i.e. the difference between target and actual current value is processed in a controller or processor 366', e.g. a PI controller. The output of the controller 366' is transformed back into the αβ coordinate system by the dq back transformation circuit 367' using the same phase angle of the respective harmonic component as a frequency reference as was used for the forward transformation in the dq transformation block 360'.

The mixer 37 (see FIG. 2) adds the control signal at the harmonic frequency output by the harmonic frequency controller 36 to the control signal at the fundamental frequency output by the harmonic frequency controller 35. The output of the mixer 37 is input into the PWM controller 38 in order to generate actuation signals based on both, the control signal at the fundamental frequency and the control signal at the harmonic frequency.

In an embodiment of the method, a harmonic component representing a negative sequence voltage component is used. Such harmonic component is usually equivalent to harmonic components of the order 3n−1 with n being an integer starting at 1. For example, the harmonic component of eighth order (n=3) may be used since this harmonic component is usually not excited by switching processes of the power semiconductor switches of the inverter bridge of the inverter 3 during normal operation. Higher order negative sequence voltage components with n>3 may be used as well. Especially even-numbered harmonic components may be used advantageously since these are excited by switching processes of the power semiconductor switches of the inverter bridge to a somewhat lower extent than odd-numbered harmonic components.

The feedback of the voltage component of the harmonic component adds a positive feedback to the control structure such that the control loop 33 is stable during normal operation of the inverter, i.e. with all phases of the energy supply grid 5 properly connected to the transformer 4. If any of the phases of the energy supply grid 5 is lost, i.e. if a single-phase phase loss occurs which has to be detected by the inverter, any harmonic component, even with minimal amplitude, is amplified by the harmonic frequency controller and results in control values which lead to a (sudden) increase of the amplitudes of the currents at the respective harmonic component. The inverter 3 disconnects from the transformer 4 or shuts down if the amplitude of the output current exceeds a threshold usually implemented in the inverter 3 for security reasons.

The method according to the disclosure does not interfere with requirements with regard to dynamic fault-ride through regulations. If a short-circuit occurs within the energy supply grid 5 the inverter has to remain connected to the energy supply grid 5 and support the stability of the energy supply grid 5 by feeding in active and/or reactive currents. In contrast to a phase loss, such short circuit does not have any effect on the stability of the control loop 33, i.e. the inverter 3 continues to operate stably and may feed in the required active and/or reactive currents.

The invention claimed is:

1. A method for operating an inverter which is connected to an energy supply grid via a transformer for feeding in electrical energy into the energy supply grid, comprising:
measuring output currents and output voltages of the inverter; and
actuating power switches of the inverter using actuation signals that are generated as a function of the measured output currents and the measured output voltages at a fundamental frequency of the energy supply grid, and
wherein the actuation signals are further generated as a function of a harmonic component of the measured output voltages of the inverter at a multiple of the fundamental frequency using a control loop with positive feedback.

2. The method according to claim 1, further comprising:
determining control values for the measured output currents as a function of differences between target values and actual values of the measured output currents;
measuring voltage components of the measured output voltages at a frequency of a harmonic component;
generating target values for current components of the measured output currents at the frequency of the harmonic component as a function of a temporal variation of the measured voltage components at the frequency of the harmonic component;
determining control values for the current components of the measured output currents at the frequency of the harmonic component based on the generated target values for the current components of the measured output currents at the frequency of the harmonic component;
adding the control values for the current components of the measured output currents at the frequency of the harmonic component to the determined control values for the measured output currents at the fundamental frequency to form a sum of control values;
generating pulse-width modulated actuation signals for the power semiconductor switches based on the sum of the control values; and
actuating the power switches using the generated actuation signals.

3. The method according to claim 2, wherein the determined control values for the current components of the measured output currents at the frequency of the harmonic component are determined as a function of differences between target values and actuals values of the current components of the measured output currents at the frequency of the harmonic component.

4. The method according to claim 2, wherein the voltage components of the measured output voltages at the frequency of the harmonic component are filtered with a high pass filter in order to determine their temporal variation.

5. The method according to claim 1, wherein the measured output voltages or the measured output currents, or both, as well as the voltage or current components at the frequency of the harmonic component are represented in a dq coordinate system.

6. The method according to claim 5, wherein the determined control values for the measured output currents at the fundamental frequency are derived as a function of positive sequence voltage components or positive and negative sequence voltage components.

7. The method according to claim 5, wherein the determined control values for the current components of the measured output current at the frequency of the harmonic component are derived as a function of negative sequence components only.

8. The method according to claim 1, wherein the harmonic component of the measured output voltages is of the order 3n−1 with n being an integer factor equal or greater than 1.

9. The method according to claim 8, wherein n equals 3 and the harmonic component of the measured output voltages is of eighth order.

10. The method according to claim 1, further comprising monitoring an amplitude of the output currents and disconnecting the inverter from the energy supply grid, or shutting down the inverter at least temporarily if the amplitude of the output current exceeds a predetermined threshold.

11. The method according to claim 1, wherein the transformer is an Ynd transformer.

12. An inverter for feeding in electrical energy into an energy supply grid via a transformer, wherein the inverter is configured to:

measure output currents and output voltages of the inverter; and actuate power switches of the inverter using actuation signals that are generated as a function of the measured output currents and the measured output voltages at a fundamental frequency of the energy supply grid, and wherein the actuation signals are further generated as a function of a harmonic component of the measured output voltages of the inverter at a multiple of the fundamental frequency using a control loop with positive feedback.

* * * * *